United States Patent [19]

Ishikawa

[11] 4,110,819
[45] Aug. 29, 1978

[54] HEADLIGHT TILTING CONTROL DEVICE OF MOTOR VEHICLE

[75] Inventor: Masao Ishikawa, Yokohama, Japan

[73] Assignee: Nissan Motor Company, Ltd., Japan

[21] Appl. No.: 740,711

[22] Filed: Nov. 10, 1976

[30] Foreign Application Priority Data

Nov. 13, 1975 [JP] Japan .............................. 50-153439[U]

[51] Int. Cl.² .............................................. B60Q 1/06
[52] U.S. Cl. ........................................ 362/40; 362/66; 362/233; 362/428
[58] Field of Search ..................... 240/61.2, 61.5, 61.6, 240/61.8, 62 H, 7.1 LJ; 362/39, 40, 43, 52, 55, 57, 58, 59, 60, 66, 233, 428

[56] References Cited

U.S. PATENT DOCUMENTS

| | | |
|---|---|---|
| 1,146,914 | 7/1915 | Allan .................................... 240/61.8 |
| 1,307,758 | 6/1919 | Sandstedt ............................ 240/61.8 |
| 3,207,891 | 9/1965 | Eberle ................................. 240/61.8 |

FOREIGN PATENT DOCUMENTS 113,660  2/1926  France ..................................... 240/61.8

Primary Examiner—J D Miller
Assistant Examiner—Peter S. Wong

[57] ABSTRACT

Two headlight frames are mounted on the vehicle body front to be tilted about their lower peripheries and are usually preloaded by a spring assembly to be limitedly tilted. A manually operable lever accessible to an operator is movable to and is held in the selected one of multiple operating positions. The manual operating effort applied to the lever is transferred through a linkage including cables or rods and pivotal levers to the headlight frame to maintain it in a certain tilted position corresponding to the selected position of the manually operable lever.

2 Claims, 8 Drawing Figures

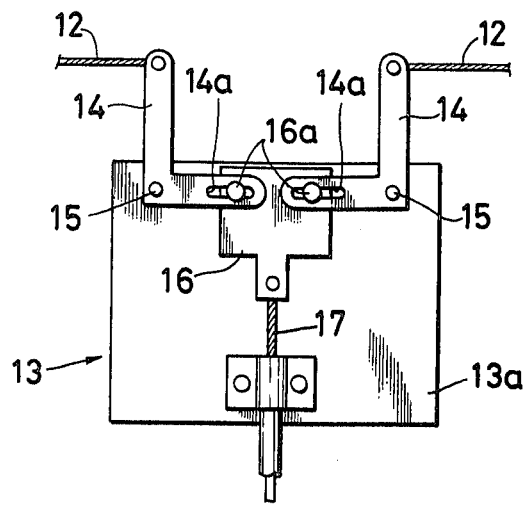
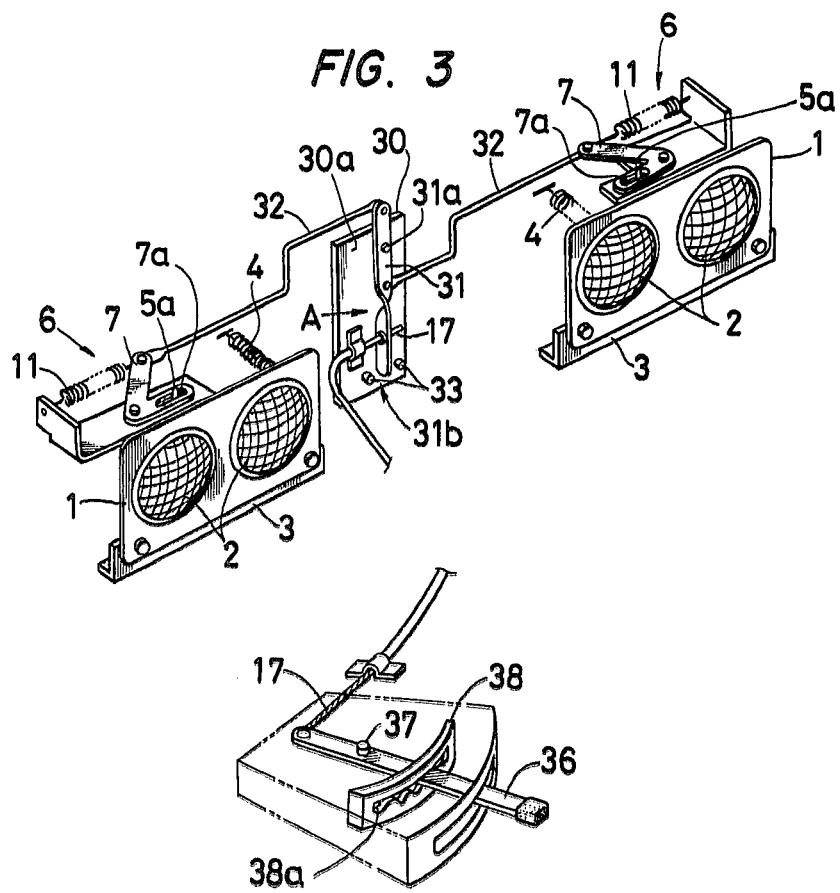

HEADLIGHT TILTING CONTROL DEVICE OF MOTOR VEHICLE

This invention relates in general to a headlight control device of a motor vehicle and more particularly to a device for controlling the tilting of the headlights of a motor vehicle.

It is already known and proposed to control the optical axis of the headlights on the motor vehicle between one position in which the headlight beam travels relatively remotely and the other position in which the beam falls nearer the vehicle body. However, such adjustment between two positions may be yet insufficient and finer control is often required, especially when sagging occurs at the front or rear of the vehicle body due to the load applied thereto.

In view of this drawback, it is also proposed to provide a headlight tilting control device in which the inclination of the vehicle body relative to the road is sensed or measured by hydraulic, electric or equivalent means and accordingly, the tilting of the optical axis of the headlight is controlled in dependence on the measured angle. Such a system however has been proved to be impractical by reason of its complexity, bulk and expense.

Accordingly, a primary object of this invention is to provide an improved and simplified headlight tilting control device of a motor vehicle.

Another object of this invention is to provide a headlight tilting control device of the character above in which the headlights are adjustable between a plurality of tilting positions in relation to the vehicle body inclination intentionally manually by an operator or occupant of the vehicle.

Yet another object of this invention is to prevent by desirably controlling the tilting of headlight a danger of accident which may result from the event that, when the vehicle body inclination with respect to the road is changed during running, the headlight beam is upwardly directed causing blinding of the driver of an approaching vehicle.

A further object of this invention is to provide a headlight tilting control device of the character above which, in simple and compact structure, dependably achieves the aforementioned operation.

According to this invention, the foregoing and other objects are achieved in any preferred embodiment of the invention being basically comprised of two headlight frames arranged on the opposite lateral ends of the vehicle body front portion, each said frame having one end pivotally mounted on a fixed part of the vehicle body and the other end constantly loaded by spring means to maintain said headlight frame in a predetermined tilted position, tilt adjusting means for providing tilting movement of said headlight frames against the load of said spring means, manually operating means located on a fixed part of the vehicle body accessible to an operator, and intermediate linkage means linked between said tilt adjusting means and said manually operating means for transferring the manually operating effort applied to said manually operating means to said tilt adjusting means. The operator is also to select any desired one of a plurality of tilting positions of the headlight to compensate for any light or heavy sagging of the vehicle body or to cope with any variation in road and environmental conditions.

The aforementioned and other objects, features and various advantages obtained by this invention will be pointed out in the following detailed explanation of two embodiments exemplarily illustrated in the drawings, in which:

FIG. 1 is a schematic perspective view of a headlight tilting control device according to a first preferred embodiment of this invention;

FIG. 2(a), (b) and (c) are enlarged detailed views respectively illustrating parts of the device shown in FIG. 1;

FIG. 3 is a schematic perspective view of a headlight tilting control device according to a second preferred embodiment of this invention;

Figure 1:
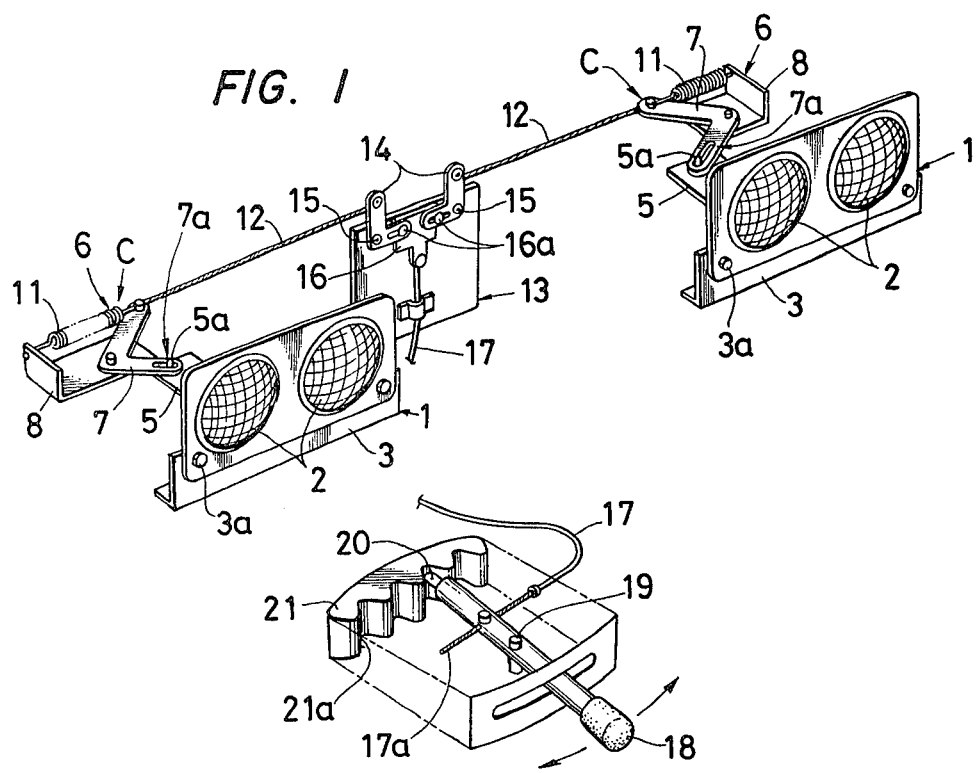
Figure 2A:
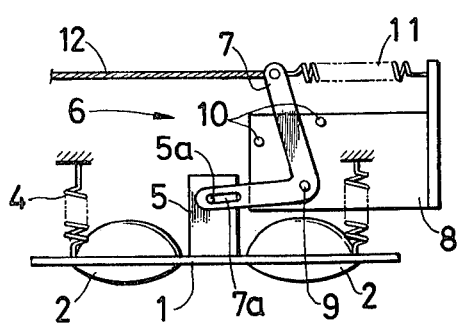
Figure 2B:
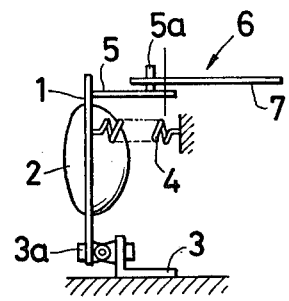
Figure 4:
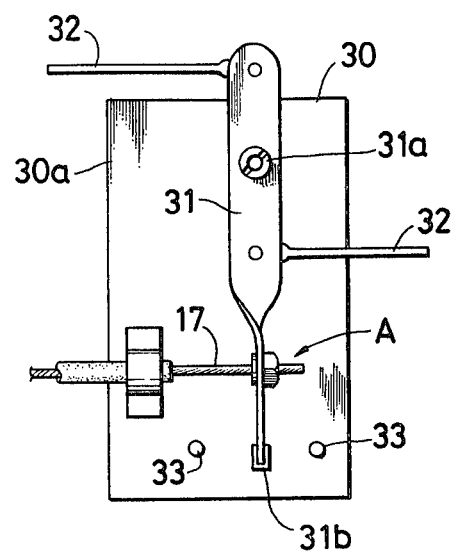
FIG. 4 is an enlarged detailed view illustrating part of the device shown in FIG. 3.

With reference to FIGS. 1 and 2, a pair of headlight frames 1 each carrying one or more headlights 2 are mounted respectively on the right and left of the vehicle body front end by pivotal mounting means 3a and fixed brackets 3 so as to be pivotal about the lower periphery of the frames 1. The description hereinafter is made only of one of the headlight frames 1 since the both frames and their accessories on the left and right are symmetrically identically constructed. As best seen in FIGS. 2(a) and 2(b), two tension springs 4 are supported between the upper peripheral portion of the rear face of said frame 1 and any stationary part of the vehicle body front end so that the frame 1 is limitedly tilted upwardly. A substantially rectangular support plate 5 is fastened to the upper central area of the rear face of the frame 1 and extends in parallel with the tension springs 4 perpendicularly to the frame 1. The plate 5 carries upright thereon a pin 5a for the purpose as will be mentioned.

Another support plate 8 with a pin 9 carried thereon is fixed to a suitable part of the vehicle body and extends rectangularly to the support plate 5. An angled arm 7 at its elbow is carried by the pin 9 on the plate 8 for pivotal movement about same. One end of the angled arm 7 is formed with an elongate slot 7a in which the pin 5a is loosely received, while the other end of the angled arm 7 is connected with another tension spring 11 which exerts a loading to the aforementioned angled arm 7 tending it to swing about the pin 9 in the clockwise-direction in FIG. 2(a). It is apparent that the lefthand angled arm 7, not shown in a detailed view, is loaded in the counter-clockwise direction by the corresponding spring. The headlight frame 1 is thus maintained in a suitably tilted position by the preselected load of these springs 4 and 11. Excessive angular movement of the angled arm 7 is limited by abutments 10 located on both sides of the arm 7 on the support plate 8.

The other end of the angled arm 7 is connected also with a connecting cable 12 which extends in the opposite directions to the spring 11.

An intermediate linkage mechanism 13 is now explained below with reference to FIG. 1 and in particular to FIG. 2(c). The linkage 13 is located substantially intermediate of the left and right headlight frames 1 and has a frame 13a extending substantially in parallel with the headlight frame 1. The frame 13a carried thereon two oppositely directed L-shaped levers 14 which are both pivotal in the opposite directions about pins 15 fixed on the linkage frame 13a. The connecting cables 12 previously mentioned, essentially of equal length, are anchored respectively to the upper ends of the L-shaped levers 14. The other, lower end of each L-shaped lever 14 is formed with an elongate slot 14a in which received is a pin 16a mounted on a movable plate 16 movable up and down relative to the frame 13a. The pins 16a are so positioned on the plate 16 that the lower ends of the L-shaped levers are arranged vis-a-vis to each other at a limited space. The movable plate 16 has a tab portion (no numeral) at a substantially equal distance from the respective pins 16a, to which a drive transferring cable 17 is connected through a guide member (no numeral). The movable plate 16 is thus moved downwardly in the FIG. 2(c) by pulling the cable 17, as will be further described.

Referring again to FIG. 1, there is shown a manual operating unit located in an instrument panel or other suitable portion of the vehicle compartment accessible to the driver or other occupant of the vehicle. The unit essentially consists of a manually operable lever 18 pivotally mounted on a stud 19 and an undulated positioning plate 21 for positioning the lever 18 to a desired position. The lever 18 is formed with a knob at one end adjacent the operator, while at the other end remote from the operator, it is provided with a slidable member 20 such as ball or roller (no numeral) engageable with the undulated surface of the plate 21 and a spring (no numeral) loading the slidable member against the undulated surface for sliding and pressure engagement therewith. As the lever is laterally moved in either direction, the ball or roller 20 travels along the undulated surface and is fitted in any groove 21a of the undulation by the action of the spring to maintain the lever 18 in the corresponding position.

The drive cable 17 leading from the movable plate 16 is anchored to the lever 18 in a manner that a rod 17a formed integrally at the end of the cable 17 extends transversely through the intermediate portion of the lever 18, the rod being slidable relative to the lever but fixable thereto at its desired longitudinal position. The overall length of the drive cable 17 is thus adjustable by protracting or retracting the rod 17a through the lever. Also, the connecting cables 12 are adjustable with respect to the length at the anchor point to the upper ends of the L-shaped levers 14, though not specifically shown.

In operation of the embodiment fully described above, as the lever 18 is moved by the operator rightwardly in FIG. 1 to any desired position and is held in this position by the aforementioned ball and spring mechanism, the drive cable 17 is retracted to pull down the movable plate 16. Consequently, the L-shaped levers 14 are both swinged about the pins 15 in the opposite directions so that their respective ends connected with the cables 12 are moved toward each other. The cables 12 are therefore pulled toward each other against the action of the springs 11. This results in that the angled arms 7 are pivoted about pins 9, applying a push force to the upper peripheral portion of the headlight frames 1 through the support plates 5 against the load of the springs 4. Thus the headlight frame 1 is tilted about the pivotal mounting means 3a forwardly by an amount selected by the operator upon movement of the lever 18 with the result that the optical axis of the headlight is downwardly directed.

If the operator moves the lever 18 oppositely, the drive cable 17 is released and the L-shaped levers 14 resume the initial positions. The force of springs 11 and 4 then urges the headlight frame 1 to the rearwardly directed position.

The second preferred embodiment of the invention is illustrated in FIG. 3 in which parts and elements like those of the first embodiment are indicated by identical reference characters. In this embodiment, rods 32, one upwardly bent and the other downwardly bent, are replaced for the connecting cables 12 of the first embodiment. The intermediate linkage mechanism 30 in this embodiment has a frame 30a carrying a vertically extending lever 31 which is pivotally mounted on a stud 31a fixed to the frame 30a. The upwardly and downwardly bent rods 32 are respectively fastened to the upper and lower sides of the stud 31a at the same distance therefrom. The lower portion of lever 31 is twisted substantially at a right angle to the upper remaining portion thereof and has connected therewith a drive cable 17. Excess pivotal movement of the lever 31 is limited by a pair of abutments 33 located on the frame 30a on either side of the lower twisted portion of the lever 31.

Figure 5A:
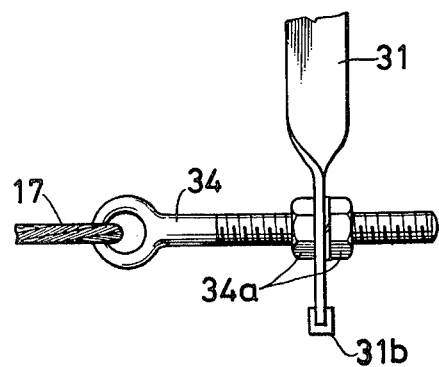
FIG. 5(a) and (b) are detailed views respectively illustrating design modifications of part of the device shown in FIG. 4.
Figure 5B:
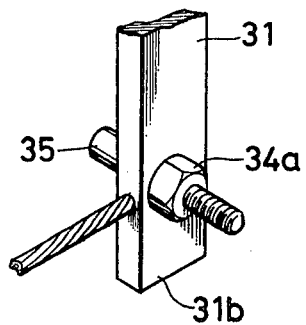

FIG. 5 illustrates two examples of the way to connect the drive cable 17 to the twisted lever 31. As shown in FIG. 5(a), the drive cable 17 may be connected to the twisted lever 31 by means of a threaded bolt 34 which is fixable to the lever 31 by nuts 34a. The threaded bolt 34 has an eye (no numeral) for passing the drive cable 17 therethrough. Otherwise, the drive cable 17 may be directly passed through a hole (not shown) in the lever 31 and fixed to the lever by fixing means 35 and 34a, as viewed from FIG. 5(b). In this case, the lever 31' is not twisted but is straight-linear. It would be apparent that, in any of the examples referred to, the length of the drive cable 17 is adjustable by protracting or retracting the bolt 34 or cable itself.

Referring back to FIG. 3, illustrating the manual operating unit of this embodiment, a curved, lever positioning plate 38 is located between the pivot pin 37 about which the manual lever 36 is moved and the knob (no numeral) of this lever. The lever 36 is passed through a dented opening 38a of the positioning plate 38 and will be engaged in any of the dents upon movement of the lever for holding it in the correspondposition. The drive cable 17 is secured to the end of the lever 36 remote from the knob.

When, in this embodiment, the lever 36 is moved to a desired position to pull the drive cable 17, the vertical lever 31 is pivoted about the pin 31a in clockwise direction in the drawing. Accordingly, the bent rods 32 are moved together toward each other. A further process of operation is essentially like the first embodiment, therefore the explanation thereof is omitted for brevity.

It thus will be seen that there are provided tilting headlight control devices which achieve the various objects of the invention and which are well adapted to meet the conditions of practical use.

All matter herein described or shown in the accompanying drawings is to be interpreted as illustrative and not in a limiting sense and various other embodiments and modifications might be made of the invention. For instance, the connecting cables 12 may be connected with the intermediate linkage 13 or 30 through a pulley system for shunting other parts and elements mounted on the vehicle body. Also, the connection of the connecting cable or rod with the L-shaped levers 14 or the twisted lever 31 may be achieved by means of cushioning springs.

What is claimed is:

1. Headlight tilting control device of a motor vehicle comprising, in combination:

two headlight frames arranged on the opposite lateral ends of the vehicle body front portion, each said frame having one end pivotally mounted on a fixed part of the vehicle body and the other end constantly loaded by spring means to maintain said headlight frame in a predetermined tilted position;

tilt adjusting means for providing tilting movement of said headlight frames against the load of said spring means;

manually operating means located on a fixed part of the vehicle body accessible to an operator comprising a manually moveable lever pivotally mounted on a fixed part of the vehicle body, a positioning plate having a plurality of grooves in any of which said manually moveable lever is received and held in position upon pivotal movement of said lever; and intermediate linkage means linked between said tilt adjusting means and said manually operating means for transferring the manually operating effort applied to a positioning plate having a plurality of grooves in any of which said manually moveable lever is received and held in position upon pivotal movement of the manually moveable lever, said intermediate linkage means comprising a linkage frame located intermediate of said two headlight frames and extending substantially in parallel with the headlight frames, a moveable plate mounted on said linkage frame to be moveable relative thereto, two oppositely directed L-shaped levers pivotally carried on said linkage frame, each said L-shaped lever having one end connected with said moveable plate and an opposite end, two connecting cables each interconnecting said opposite end of the angled arm and said opposite end of the L-shaped lever, and a drive transferring cable having one end connected with said moveable plate and the other end length-adjustably connected with said manually moveable lever.

2. Headlight tilting control device of a motor vehicle comprising, in combination:

two headlight frames arranged on the opposite lateral ends of the vehicle body front portion, each said frame having one end pivotally mounted on a fixed part of the vehicle body and the other end constantly loaded by spring means to maintain said headlight frame in a predetermined tilted position;

tilt adjusting means for providing tilting movement of said headlight frames against the load of said spring means;

manually operating means located on a fixed part of the vehicle body accessible to an operator, comprising a manually moveable lever pivotally mounted on a fixed part of the vehicle body, a positioning plate having a plurality of grooves in any of which said manually moveable lever is received and held in position upon pivotal movement of the manually moveable lever, and intermediate linkage means linked between said tilt adjusting means and said manually operating means for transferring the manually operating effort applied to said manually operating means to said tilt adjusting means, comprising a linkage frame located intermediate of said two headlight frames and extending substantially in parallel with the headlight frames, a vertical lever pivotally carried on said linkage frame about a pivot axis, an upwardly bent connecting rod interconnecting said opposite end of one of said angled arms and an upper portion of said vertical lever at a certain distance from the pivot axis, a downwardly bent connecting rod connecting said opposite end of the other angled arm and a lower portion of said vertical lever at a distance equal to said certain distance from the pivot axis, and a drive transferring cable having one end length-adjustably connected with said vertical lever and the other end connected with said manually moveable lever.

* * * * *